(12) United States Patent
Shen et al.

(10) Patent No.: US 10,447,431 B2
(45) Date of Patent: *Oct. 15, 2019

(54) ROBUST LINE CODING SCHEME FOR COMMUNICATION UNDER SEVERE EXTERNAL NOISES

(71) Applicant: AVAGO TECHNOLOGIES GENERAL IP (SINGAPORE) PTE. LTD., Singapore (SG)

(72) Inventors: Ba-Zhong Shen, Irvine, CA (US); Ahmad Chini, Mission Viejo, CA (US); Chung Ming Tu, Irvine, CA (US); Mehmet Vakif Tazebay, Irvine, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,026

(22) Filed: Oct. 13, 2017

(65) Prior Publication Data

US 2018/0041303 A1 Feb. 8, 2018

Related U.S. Application Data

(63) Continuation of application No. 14/705,608, filed on May 6, 2015, now Pat. No. 9,819,444.
(Continued)

(51) Int. Cl.
*H03M 13/00* (2006.01)
*H04L 1/00* (2006.01)
(Continued)

(52) U.S. Cl.
CPC .......... *H04L 1/0041* (2013.01); *H04L 1/0042* (2013.01); *H04L 27/04* (2013.01); *H04L 67/12* (2013.01); *H04L 25/4917* (2013.01)

(58) Field of Classification Search
CPC ..... H04L 1/0041; H04L 1/0042; H04L 27/04; H04L 25/4917; H04L 67/12
See application file for complete search history.

(56) References Cited

U.S. PATENT DOCUMENTS

2005/0099966 A1 5/2005 Huang et al.
2007/0250752 A1* 10/2007 Prosch .............. H03M 13/2707
714/752
(Continued)

*Primary Examiner* — Samir W Rizk
(74) *Attorney, Agent, or Firm* — Morgan, Lewis & Bockius LLP

(57) ABSTRACT

A system to implement a communication line coding scheme using a non-complex bit-to-symbol mapping, a forward error correction (FEC) coding, and an additive bit scrambler after the FEC at the PHY layer is provided. The system may be a part of or implemented by an automobile component. The system may be a PHY device configured to convert data from the MAC layer into 2D-PAM3 symbols that are transmitted across a communication link at a predetermined transmission rate, such as to be compliant with a communication standard. The PHY device may select characteristics of the conversion, such as the FEC coded symbol, based on the target transmission rate. The PHY device may include a transceiver, and may convert the data from MAC layer to PHY layer and back.

20 Claims, 10 Drawing Sheets

Related U.S. Application Data

(60) Provisional application No. 61/991,331, filed on May 9, 2014.

(51) Int. Cl.
*H04L 27/04* (2006.01)
*H04L 29/08* (2006.01)
*H04L 25/49* (2006.01)

(56) References Cited

U.S. PATENT DOCUMENTS

| | | | |
|---|---|---|---|
| 2009/0010318 A1* | 1/2009 | Belogolovyi | H04B 14/023 375/222 |
| 2009/0323566 A1 | 12/2009 | Lin | |
| 2010/0329247 A1* | 12/2010 | Kennedy | H04B 1/7163 370/389 |
| 2011/0320905 A1 | 12/2011 | Lin et al. | |

* cited by examiner

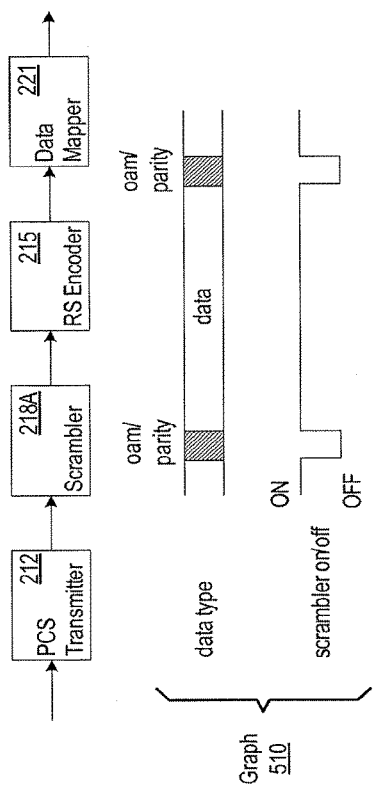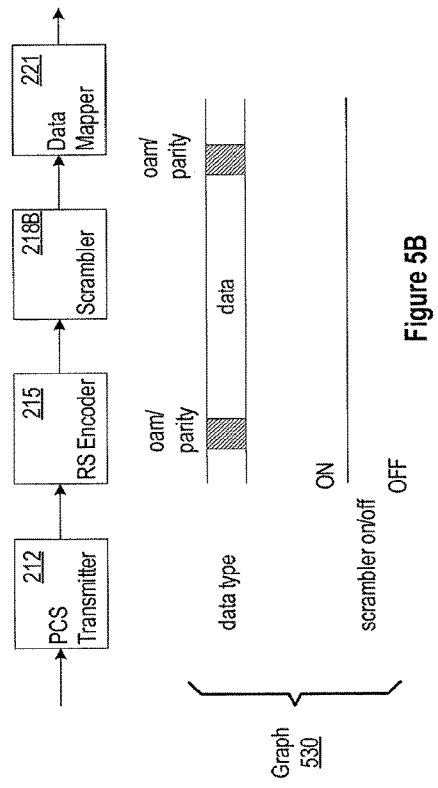

ROBUST LINE CODING SCHEME FOR COMMUNICATION UNDER SEVERE EXTERNAL NOISES

CROSS REFERENCE TO RELATED APPLICATIONS

This application is a continuation application of U.S. application Ser. No. 14/705,608, filed May 6, 2015, now issued as U.S. Pat. No. 9,819,444, which claims priority to Provisional Application No. 61/991,331, filed May 9, 2014, which are incorporated by reference in their entirety.

TECHNICAL FIELD

This disclosure relates to, networking hardware used for communication.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in packet handling, including improvements in path resolution, will further enhance performance of data networks.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIGS. 5A and 5B illustrate examples of PHY circuitry;

DETAILED DESCRIPTION

In certain communication applications under severe noises, such as the IEEE 802.3bp 1000BASE-T1 automotive Ethernet PHY, it may be desirable to have a robust system while at the same time achieve target high speed data rates, even under severe external noises. The external noises may be due to narrow band interferences, mechanical vibrations, electrostatic discharges, or other sources. Furthermore the characteristics of these noises may rapidly change in time. It may be further desirable to maintain a robust system and minimize interruptions to the communication link.

The disclosure described below provides networking hardware comprising circuitry using a robust line coding scheme for communication under severe external noises. The scheme uses a non-complex bit-to-symbol mapping, the forward error correction (FEC) coding, and an additive bit scrambler after the FEC. The line coding scheme may be utilized in various communication environments, such as in the automobile 1000 Mbits per second Ethernet PHY over single unshielded twisted pair (UTP) IEEE 802.3bp application. The scheme may be extended to applications other than 802.3bp, for example to 100 m industrial Ethernet PHY applications. Further, instead of a single UTP cable, the scheme may be extended to 2 or more pairs of UTP cables, or to coaxial or shielded twisted pair (STP) cable types and/or other communication links.

The line coding scheme may use a signal constellation for coded data being communicated using the UTP. Further, the same signal constellation, or another signal constellation may be used for training during a link-up process. Separate signal constellations may be used during a low power idle (LPI) mode. Example LPI and stream markers used during the communication using the line coding scheme are also described. Further, example clock structure(s) that may be used for interfacing a Gigabit Media Independent Interface (GMII) and a Medium Dependent Interface (MDI) or a Medium Dependent Interface Crossover (MDI-X) is also described.

Figure 1:
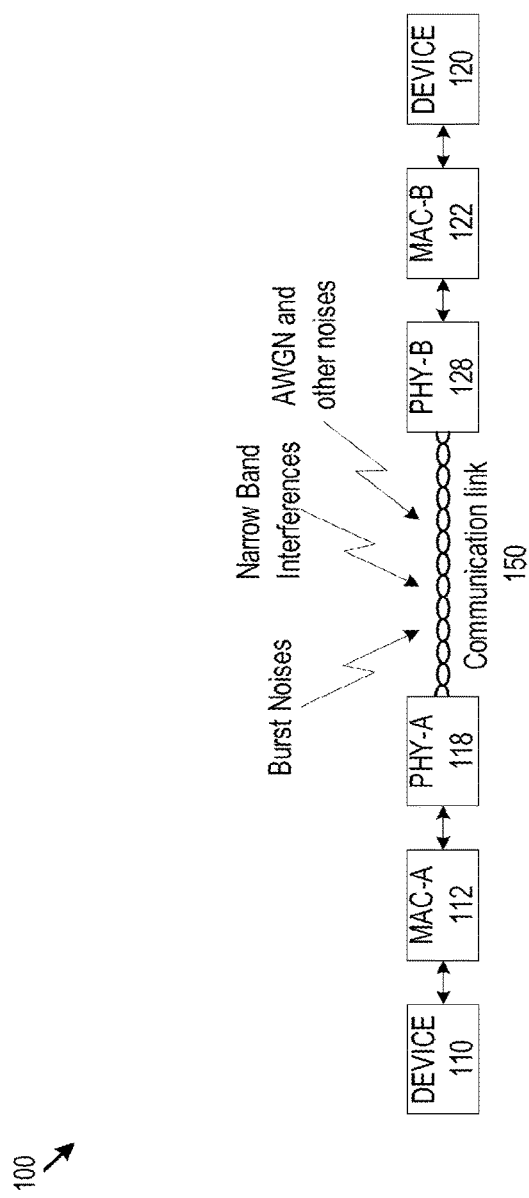
FIG. 1 illustrates an example communication system under severe noise environments.

FIG. 1 illustrates an example communication system 100 under severe noise environments, such as in an automobile. The automobile may be a vehicle such as a car, a truck, a motorbike, a van, an airplane, a boat, or any other automobile. The communication setup 100 may include two devices 110 and 120 that communicate via network communication protocols, such as Ethernet, via a communication link 150 with Media Access Control (MAC) and PHY circuitry on either ends of the communication link. The MAC circuitry may include MAC-A 112 and MAC-B 122 that implement link layer functions of the network communication protocols. Further, the circuitry PHY-A 118 and PHY-B 128 may implement physical layer functions of the network communication protocols. The PHY-A 118 and PHY-B 128 may be connected to each other via the communication link 150.

For example, the device 110 and device 120 may be devices that are part of a driver assistance system, and/or a vehicle infotainment system. For example, the device 110 may be automobile component. The automobile component may be, for example, a sensor system such as a video camera, a sound navigation and ranging (SONAR) system, a tire pressure monitoring system, a brake sensor, or any other sensor of an automobile. In another example, the device 110 may be a media player such as a radio, a satellite radio, a video player and/or an audio player. In another example, the device 110 may be an automobile component such as a navigation system. The device 110 may be other sources of data in an automobile environment in other examples. The device 120 may be a device that receives data from the device 110. For example, the device 120 may be another automobile component such as a display device. In other examples, the device 120 may be any of the devices listed above receiving data from another data source. For example, the navigation system may be a data receiver when receiving instructions from controls in the automobile, the controls acting as a data source in this case.

The MAC-A 112 and MAC-B 122 may include circuitry that implements link layer functions of the network communication protocols used by the communication setup 100. For example, operations in the link layer, or sometimes referred to as data link layer, may include establishment and control of logical links between devices on a network. The MAC-A 112 and MAC-B may facilitate encapsulation and/or deciphering data into frames that are sent and/or received over the communication link 150. The MAC-A 112 and MAC-B 122 may further identify the frames with particular destination address, such as the MAC address of the destination. They may further detect and correct errors in data received, for example by performing cyclic redundancy check (CRC). The MAC-A 112 is an interface between the device 110 and the PHY-A 118. The MAC-B 122 is an interface between the device 120 and the PHY-B 128.

The communication link 150 may be a UTP cable or of other cable types. In an example, the communication link 150 may be up to 15 meters long. The data from the device 110 and device 120 may be communicated across the communication link 150. The communication link 150 may be exposed to several external sources of noise that may corrupt the data being transmitted. For example, the communication link 150 may experience burst noises that are typically concentrated in time. Alternatively or in addition, the communication link 150 may experience Narrow Band interferences (NBI) that are noises concentrated in a particular frequency range, and may visually be similar to a sinusoidal wave. In another example, the communication link 150 may experience other noises such as Additive White Gaussian Noise (AWGN). It may be desirable to mitigate the effects of external noises using the PHY circuitry.

Figure 2:
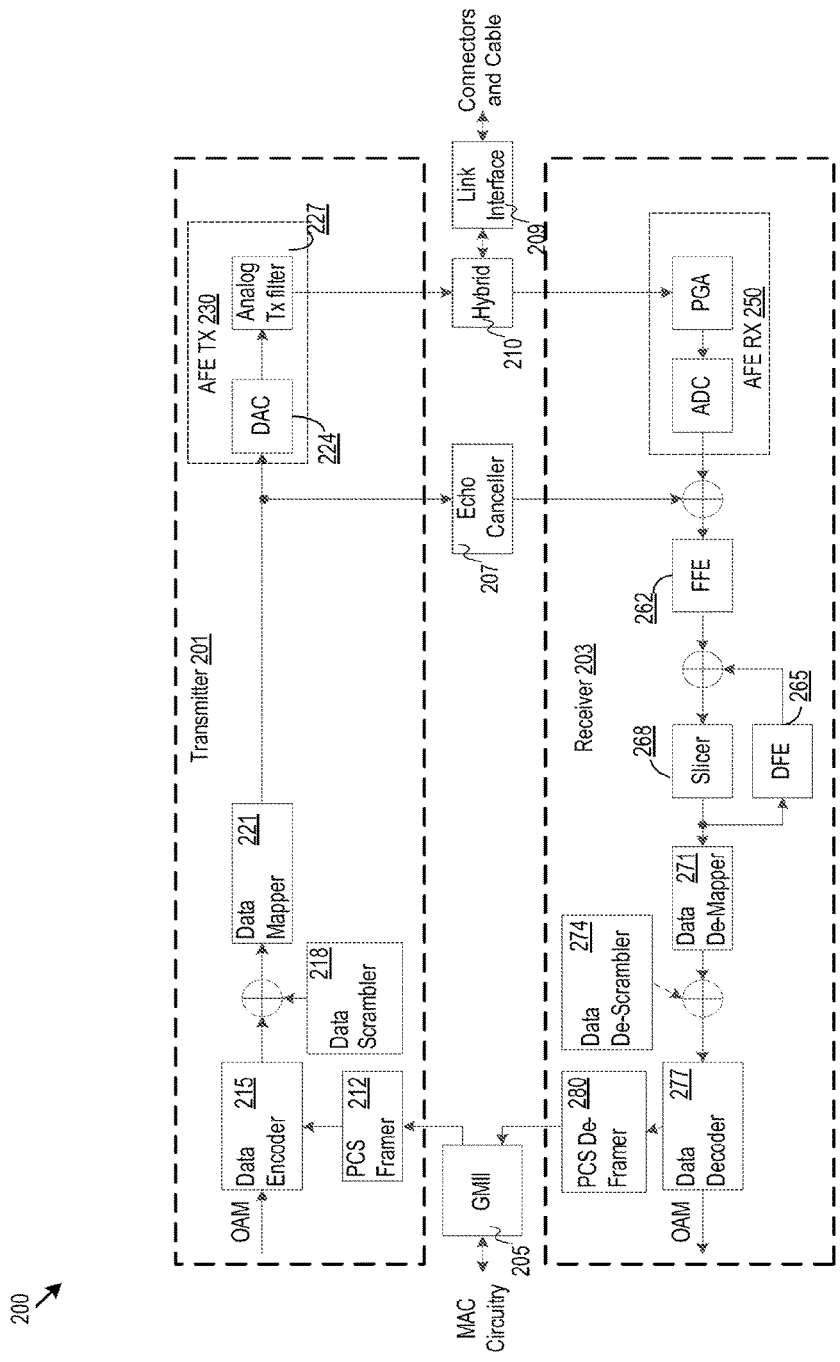
FIG. 2 illustrates an example PHY circuitry.

FIG. 2 illustrates an example PHY circuitry 200. The PHY circuitry 200 may be an integrated circuit including digital and analog components, or other type of circuitry such as in the form of a chip. Part of the PHY circuitry 200 may also be implemented as software or firmware with an embedded or external digital signal processor (DSP) or micro controller. The PHY circuitry 200 may transmit and receive the data physically across the communication link 150. The PHY-A 118 and/or the PHY-B 128 may include the PHY circuitry 200. The PHY circuitry 200 may transmit data at a predetermined target rate, such as 1000 Mbits per second. To achieve the predetermined target rate, the PHY circuitry 200 may transmit data at a corresponding baud rate. The baud rate indicates a symbol rate or modulation rate expressed in symbols per second or pulses per second. The baud rate is the number of distinct symbol changes (signaling events) per second made by the PHY circuitry 200 to the communication link 150. The symbols may be transmitted as part of a digitally modulated signal.

The PHY circuitry 200 provides technical solutions to achieve desired robust transmission of data, such as IEEE 802.3 or Ethernet data, at a predetermined target rate, such as 1000 Mbits per second in an automobile environment. The PHY circuitry 200 may implement a line coding scheme. The line coding scheme may be configured to convert data from the MAC circuitry in a predetermined format, for example symbols of a predetermined length. Based on the line coding scheme, the PHY circuitry 200 may be configured, or adjusted to transmit the generated symbols at a predetermined baud rate to achieve a predetermined target data transmission rate. For example, to achieve data transfer rate of 1000 Mbits per second, the PHY circuitry 200 may generate symbols that are 9 bits long, apply Reed-Solomon FEC encoding, apply 3 bits to 2 PAM3 symbols mapping, and operate at a 750 MHz baud rate. The PHY circuitry may perform forward error correction when receiving the symbols so that the communication is robust and meets a specified error threshold.

The PHY circuitry 200 may include circuitry such as a transmitter 201, a receiver 203, a media independent interface (MII) 205, an echo canceller 207, a hybrid 210, and a link interface 209.

The media independent interface 205 may be a communication interface that connects the PHY circuitry 200 with the MAC circuitry. The media independent interface may be a reduced media-independent interface, a gigabit media-independent interface (GMII), a reduced gigabit media-independent interface, a serial gigabit media-independent interface (SGMII), or any other type of media independent interface.

The hybrid 210 may be analog circuitry that cancels the transmitted signals that are coupled into the received signals. For example, the hybrid 210 may reduce electric signal reflections due to transmission and reception of signals over the same communication link 150.

The echo canceller 207 may be circuitry that facilitates mitigation of residual reflected signals from the transmitter 201. For example, the echo canceller 207 may further reduce remnant transmit signal reflections after cancellation by the hybrid 210.

The link interface 209 may be a communication interface that connects the PHY circuitry 200 with the communication link 150. For example, the link interface 209 may be a two-pin connector for single pair automotive Ethernet, a registered jack (RJ) type connecter such as a RJ45 connector, a RJ48 connecter, a RJ61 connecter, or any other type of communication link interface. The link interface 209 may facilitate transmission and reception of data via the communication link 150 using a variable input/output voltage range.

The transmitter 201 may be circuitry that facilitates transmission of data via the communication link 150. The transmitter 201 may facilitate conversion of digital input data received from the media independent interface 205 to analog output voltage levels transmitted via the hybrid 210 and the link interface 209. The transmitter 201 may convert the input data at a predetermined rate to meet the predetermined data transmission rate. In an example, the transmitter 201 may include a physical coding sublayer (PCS) framer 212, a data encoder 215, a transmission data scrambler 218, a data mapper 221, and an analog front end transmitter (AFE TX) 230.

The receiver 203 may be circuitry that facilitates reception of data via the communication link 150. The receiver 203 may facilitate conversion of analog input voltage levels received via the link interface 209 and hybrid 210 to digital data provided to the MAC circuitry via the media independent interface 205. The receiver 203 may convert the analog voltage levels at a predetermined rate to meet the predetermined data transmission rate at which the analog signals may be received. In an example, the receiver 203 may include an analog front end receiver (AFE RX) 250, a feed forward equalizer (FFE) 262, a decision feedback equalizer (DFE) 265, a slicer 268, a data de-mapper 271, a data de-scrambler 274, a data decoder 277, and a PCS de-framer 280.

Figure 3:
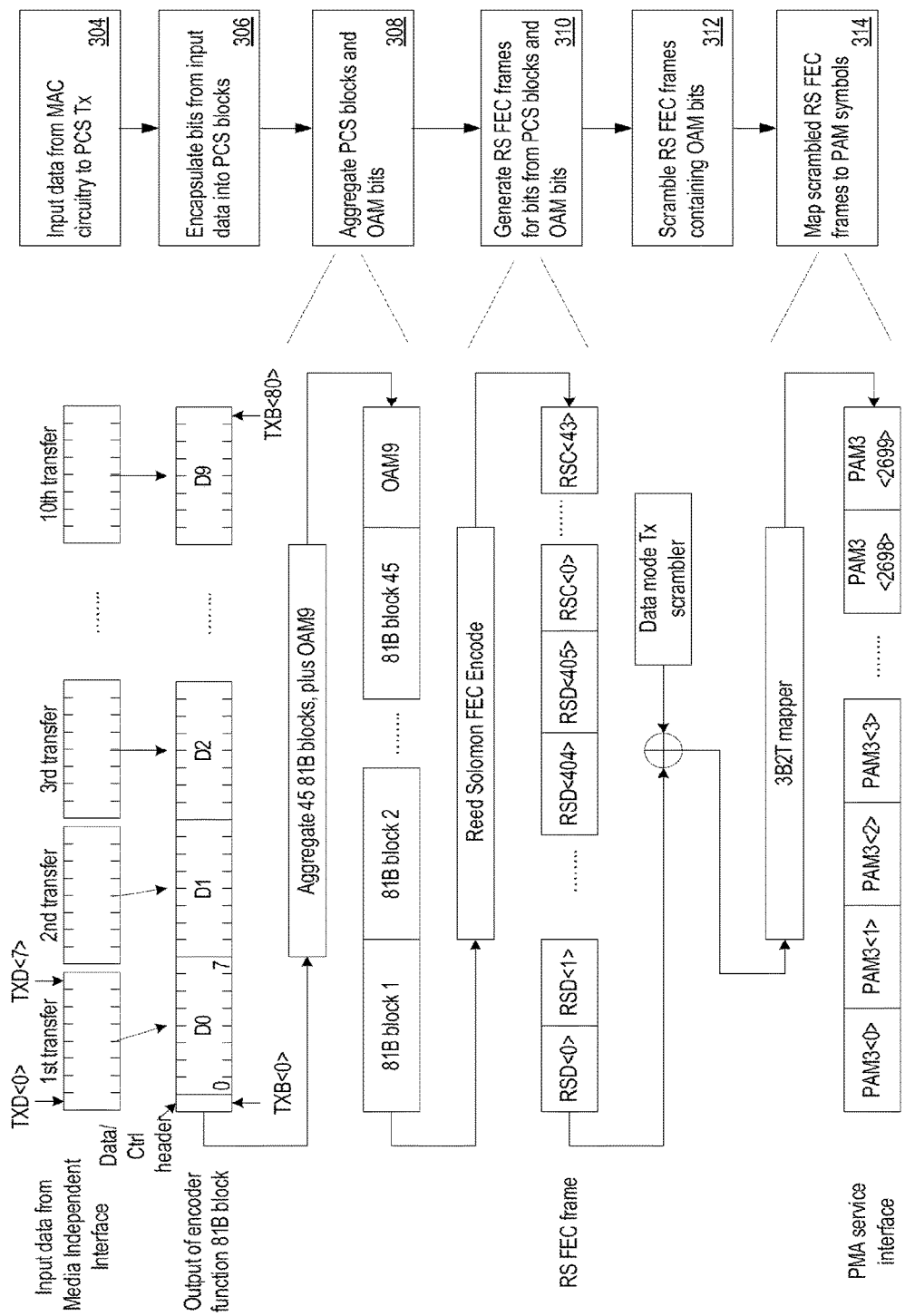
FIG. 3 illustrates an example data flow through the digital components of the transmitter.

FIG. 3 illustrates an example data flow through the digital components of the transmitter 201.

The PCS framer 212 may receive the input data from the MAC circuitry via the media independent interface 205. (304) The PCS framer 212 may be circuitry that converts the input data into PCS frames. The input data may be binary data that is in the form of bits (for example 0, 1). The bits may be received in collections. For example, FIG. 3 illustrates receiving 8-bit words from the MAC circuitry. In response to receipt of a predetermined number of bits, or collections of bits, the PCS framer 212 may add a header, such as a data/control header. For example, upon receipt of 80 bits (10 8-bit words), the PCS framer 212 may generate and add header information.

The PCS framer 212 may convert the input data and the header bits into blocks of a predetermined size. (306) For example, the PCS framer 212 may be an 80/81 converter that receives 80 bits as input data and outputs a corresponding 81 bits. For example, the 80/81 converter may aggregate ten 8-bit blocks to output corresponding 81 bits that may include one bit representative of header information for the aggregated bits. In an example, the PCS framer 212 may output an 81-bit block that contains the aggregated input data and the header information. The PCS framer 212 may send the output block to the data encoder 215.

The data encoder 215 may aggregate blocks from the PCS framer 212 along with management bits, such as operation, administration, and maintenance (OAM) bits. (308) The OAM bits may be used by a communication standard or protocol to identify information such as related to monitoring and troubleshooting the communication setup 100. For example, the OAM bits may be Ethernet OAM (EOAM) bits. The OAM bits may be part of a protocol for installing, monitoring, and troubleshooting the network. In an example, the OAM bits may be received from an optional sublayer device in the data link layer of the OSI model, such as specified in the IEEE 802.1ag, or the ITU-T Y.1731, or other similar standards or specifications.

The data encoder 215 may aggregate a predetermined number of blocks from the PCS framer 212 and a predetermined number of OAM bits. In an example, the data encoder 215 may aggregate 45 81-bit blocks from the PCS framer 212. In addition, the data encoder 215 may receive and aggregate nine (9) OAM bits. Thus, the example data encoder may aggregate 45×81+9=3,654 bits.

The data encoder 215 may process the bits from the aggregated blocks and the OAM bits to output one or more FEC frames. (310) The data encoder may be, for example, a Reed-Solomon (RS) encoder. Accordingly, in this example, a FEC frame may be referred to as an RS frame, or an RS-FEC frame. A group of binary bits in the FEC frame may be defined as a symbol, such as an RS symbol. For example, the RS symbol may be nine (9) bits long and the RS-FEC frame may include multiple RS symbols. The data encoder 215 may select the size of the FEC frame. For example, the size of the FEC frame may be based on a target transmission rate across the communication link 150. Alternatively or in addition, the size of the FEC frame may be based on the number of OAM bits. In another example, the OAM bits aggregated by the data encoder 215 may be based on the predetermined size of the FEC frame. The generated FEC frames may contain some data symbols, which are referred to as RSD symbols. In addition, the data encoder 215 may generate parity check symbols, which are referred to as RSC symbols. Data bits received from the aggregated PCS framer outputs and the OAM bits may be considered as the RSD symbols.

For example, in the above case the data encoder 215 may generate an RS-FEC frame containing 450 total RS symbols, with 406 RSD symbols and 44 RSC symbols, and each symbol being 9 bits long. The RS encoder may forward the FEC frames to the data scrambler 218.

The data scrambler 218 may scramble the RS-FEC output frames. (312) The scrambling may facilitate avoiding long sequences of bits of the same value or of repeating bit patterns. Consequently, the scrambling may also facilitate timing the data accurately at the PHY circuitry 200 that receives the data without using redundant line coding. Additionally, the scrambling may reduce unwanted spurs in the transmit power spectral density measured in the frequency domain.

Figure 4:
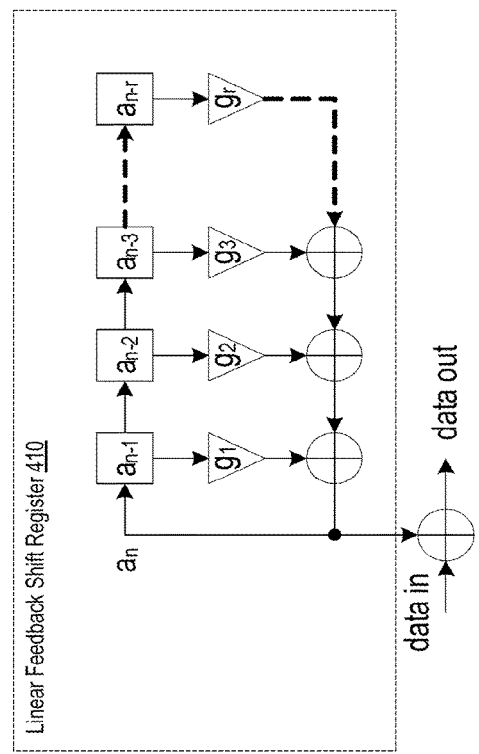
FIG. 4 illustrates an example data scrambler.

FIG. 4 illustrates an example data scrambler 218. In an example, the data scrambler 218 may be an additive data scrambler, also known as a synchronous scrambler. The additive data scrambler may be circuitry that transforms the input data stream of FEC frames by applying a pseudo-random binary sequence (PRBS) with operations such as modulo-two additions. The PRBS may be generated by a linear feedback shift register (LFSR) 410. Alternatively, the PRBS may be a pre-calculated PRBS stored in a memory. The PRBS may provide a scheme to scramble the data, such as the one illustrated by the LFSR 410. Other examples of PRBS are possible. The data scrambler may remain inactive during the initial link up process, and may only get initialized and started at a specific time known to both the transmitter and the receiver.

FIG. 5A illustrates the example PHY circuitry 200 in which an example data scrambler 218A may receive output from the PCS framer 212, and the output of the data scrambler 218A may then be forwarded to the data encoder 215. The timing graph 510 illustrates that in this arrangement, the data scrambler 218A is ON, or is enabled to scramble the data bits that are to be encoded into the RSD frames by the data encoder 215. However, the data scrambler 218A is OFF for the OAM or parity bits. Thus, the data scrambler 218A does not scramble the OAM bits that are to be encoded into the RSC frames by the data encoder 215. Accordingly, in the example PHY circuitry 200 of FIG. 5A, since the OAM bits are not scrambled, the OAM bits may exhibit a fixed pattern.

FIG. 5B illustrates an example of the PHY circuitry 200 which may include an example of a data scrambler 218B configured to receive output of the data encoder 215. Accordingly, unlike the data scrambler 218A, the data scrambler 218B may scramble both, the data bits in the RSD frames and the OAM or parity bits in the RSC frames. The graph 530 depicts that the data scrambler 218B is always ON. Thus, the data scrambler 218B scrambles all bits, regardless of whether they are data bits or OAM/parity bits. Accordingly, the OAM bits in this case may be scrambled unlike the sequence in FIG. 5A. In addition, the data scrambler 218B may scramble bits of data that the PHY circuitry 200 may transmit to indicate that the PHY circuitry 200 is in LPI mode. Alternatively or in addition, the data scrambler 218B may scramble bits of data that the PHY circuitry 200 may transmit to indicate that the PHY circuitry is refreshing from the LPI mode to a normal data transmission mode.

The data scrambler 218B may exchange an initial state with a corresponding de-scrambler at the receiver. The data scrambler 218B may continuously run once started. Thus, no synchronizing bit patterns are transmitted (or received) in case of the data scrambler 218B. Accordingly, the de-scrambler at the receiver's PHY circuitry may not be affected by bit errors, as long as clock timing remains locked. The scrambled FEC frames from the data scrambler 218B may be forwarded to the data mapper 221.

The data mapper 221 may convert the scrambled FEC frames to pulse amplitude modulation (PAM) symbols. (314) For example, the data mapper may be a three-binary-to-two-ternary (3B2T) mapper that maps 3 binary bits into 2 PAM symbols. The PAM symbols may be based on a scheme such as a PAM3 constellation.

The AFE TX 230 may facilitate conversion of digital data to analog signals. The AFE TX may output the analog signals to the hybrid 210 and link interface 209, which may further transmit the signal over the communication link 150. In an example, the AFE TX 230 may include a digital-to-analog converter (DAC) 224, and a transmission analog filter 227. The DAC 224 may convert data from digital to analog form. The transmission analog filter 227 may filter the electronic signals prior to transmission via the communication link 150. The DAC 224 may map a digital signal output by the data mapper 221 to a predetermined voltage level. For example, the data mapper 221 may convert the binary data to ternary data. Ternary data may be a base 3 system. In an example, the binary data with values 0 and 1 may be converted to balanced ternary data with values −1, 0, and 1. Subsequently, the PMA interface 230 may map ternary data (1, 0, and −1) to three distinct voltage levels such as −0.5V, 0V, and +0.5V.

The PHY circuitry 200, thus, may implement a line coding scheme to generate symbols using the data encoder 215, the data scrambler 218, and the data mapper 221. The PHY circuitry 200 may be configured to implement the line coding scheme according to a target data transmission rate.

The line coding scheme described may be used by a system such as IEEE 802.3bp 1000BASE-T1 PHY or any other signaling protocol. The PCS may generate continuous code-group sequences that a Physical Medium Attachment Sublayer (PMA) transmits over the communication link 150, such as a twisted wire pair, a coaxial cable, or other types of cables.

The PHY circuitry 200 may be configured to implement the line coding scheme according to several other factors. For example, the line coding scheme may provide a mapping between the FEC frame and data that is transmitted as PAM symbols across the communication link 150. Alternatively or in addition, the scheme may provide an algorithmic mapping and inverse mapping from data to PAM symbols. The scheme may facilitate detection and/or communication of uncorrelated symbols in the transmitted symbol stream. There may be no correlation between symbol streams traveling in both directions using the coding scheme.

Alternatively or in addition, the line coding scheme may provide an ability to signal the status of a local receiver to the PHY circuitry 200 to indicate that the local receiver is not operating reliably and should be retrained. Further yet, the line coding scheme may facilitate signaling a request to the PHY circuitry 200 to enter the LPI mode. The line coding scheme may also facilitate signaling the PHY circuitry 200 to exit the LPI mode and return to normal operation. The PHY circuitry 200 may also be signaled that an update of the local receiver state (such as, timing recovery, adaptive filter coefficients) has completed. The line coding scheme may facilitate the system to automatically detect and correct for incorrect polarity in the connections.

Figure 6:
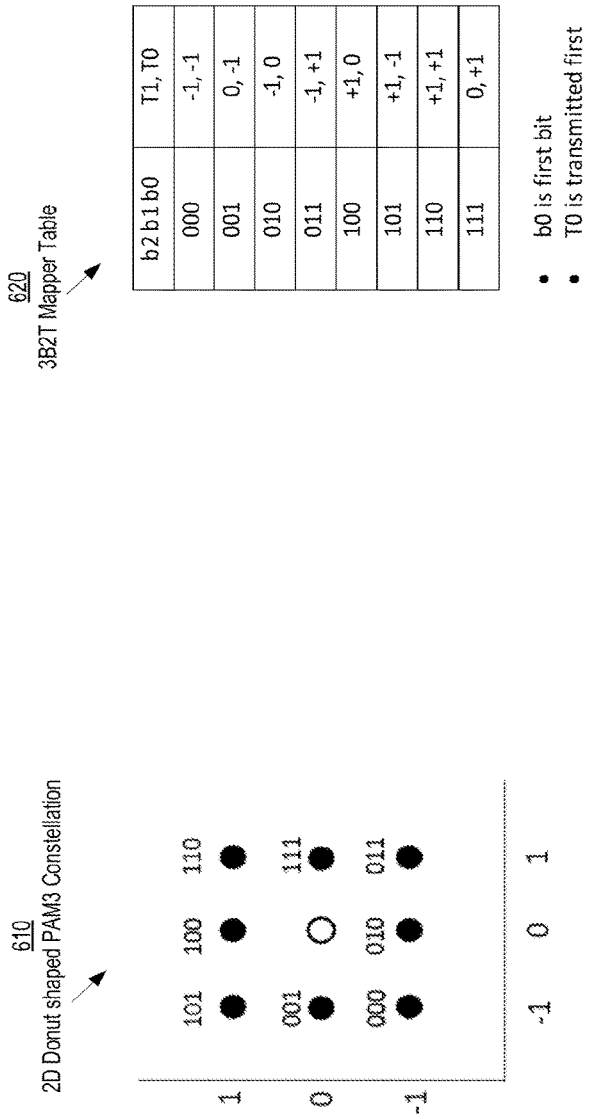
FIG. 6 illustrates an example 3B2T data mapper.

FIG. 6 illustrates an example of the 3B2T data mapper that may be implemented in the PHY circuitry 200. The mapper may use a 'donut' shaped constellation 610. A constellation may be a collection, or pattern of bits used to transmit a symbol via the communication link. The data mapper described throughout the present disclosure uses a 3-bit PAM (PAM3) symbol. However, symbols of other lengths are possible. The data mapper may use the constellation 610 including 8 points (1, 0), (1, 1), (0, 1), (−1, 1), (−1, 0), (−1, −1), (0, −1), and (1, −1), of the 9 possible points.

The mapper may be implemented by the transmitter 201 of the PHY, such as a 1000BASE-T1 compliant PHY for automobile application. The data mapper may assign 3 bits to 2 ternary symbols from a 2D PAM3 constellation. The (0, 0) point in the center may be either unused, or used for Start-of-Stream Delimiter (SSD) and/or End-of-Stream Delimiter (ESD) and/or Low-Power-IDLE (LPI) or any other special control signal. When the (0, 0) point is used for such purposes the line coding scheme may provide a short mapping sequence for data encoding and decoding and may balance the bit assignment with no DC component. The line coding scheme may have a low Peak Average Rate (PAR) such as 1.25 DB before Power Spectral Density (PSD) shaping. The Euclidean distance between some of the constellation points may improve immunity for noise vectors. The line coding scheme may use additional power to mitigate error propagation. Alternatively, the line coding scheme may use additional Euclidean distance to mitigate error propagation.

Figure 7:
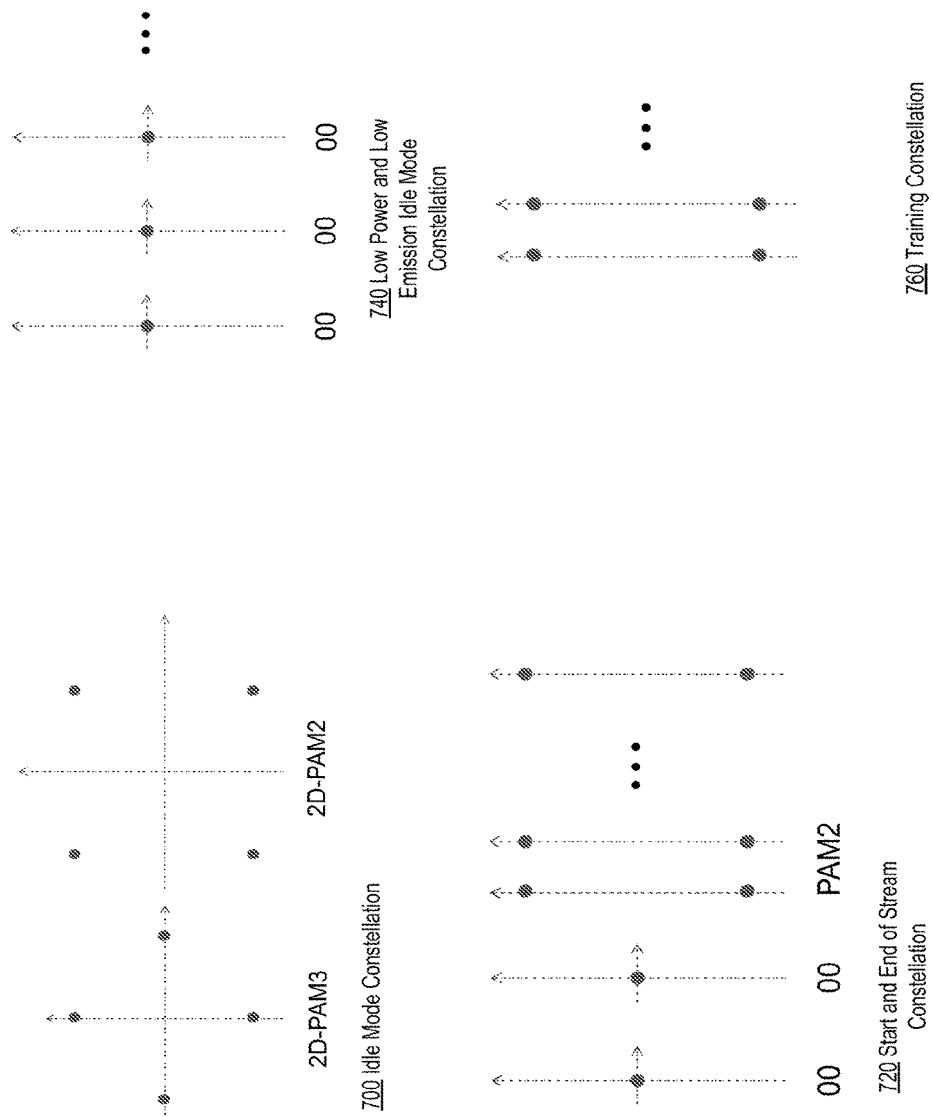
FIG. 7 illustrates example constellations that may be used by a PHY circuitry.

FIG. 7 illustrates example constellations that may be used by the PHY circuitry using the line coding scheme based on the donut shaped 2D PAM3 symbols, such as idle mode constellation 700, start and end of stream constellations 720, Low Power and Low Emission Idle Mode Constellation 740, and a training constellation 760. Accordingly, the PHY circuitry 200 may transmit and receive signals across the communication link 150 that include the constellations. The 2D donut shapes of the symbols may be observable using an oscilloscope.

The constellation 700 may involve idle symbols transmitted over 4 transmit symbols using 4 scrambler bits. The constellation may provide a short mapping sequence and a balance assignment with no DC component. Further, the constellation 720 may provide increased Euclidean distance compared to data constellation. The 00 point may be left for SSD/ESD, LPI, or any other special control symbol. Further line coding scheme using 2D PAM3 symbols may facilitate the PHY circuitry 200 to use the same average and same peak power as data to maintain PSD limit and emission desired levels. The 720 constellation may be used for signaling a start of stream or an end of stream signal (SSD/ESD). The 00 point may be used as marker indication. In order to reduce false detection, 00 may be repeated (two or three times). Subsequent PAM2 symbols carry the corresponding SSD/ESD message. Redundant PAM2 symbols may be added to improve detection in noise. The SSD/ESD markers may allow going in and out of Idle mode without additional latency. The 740 constellation may be used for low power and low emission idle modes. Constellation 740 may enable fast recognition of LPI mode without requiring additional handshaking between two sides (such as network communication devices) of the communication link. This may further facilitate fast refresh periods for improved tracking as well as low emission idle (for example refresh periods faster than 10 uS). The emission may be measured on 100 KHz BW. Thus, using constellations such as 740 constellation, the line coding scheme using 2D PAM3 symbols may provide options to go in and out of LPI mode with little or no latency. The constellation 760 may be a training constellation. The constellation may involve the largest minimum distance to provide a robust link up on strong noise presence. Further the line coding scheme using 2D PAM3 symbols may provide a single dimensional mapping, so that no symbol synchronization may be performed with blind equalization. Further, line coding scheme using 2D PAM3 symbols may facilitate balancing assignment with no DC component. Further yet, using the 2D PAM3 constellations of the line coding scheme may facilitate the system that includes the PHY circuitry 200 to use the same DAC levels and PSD shaping as in data mode.

Figure 8:
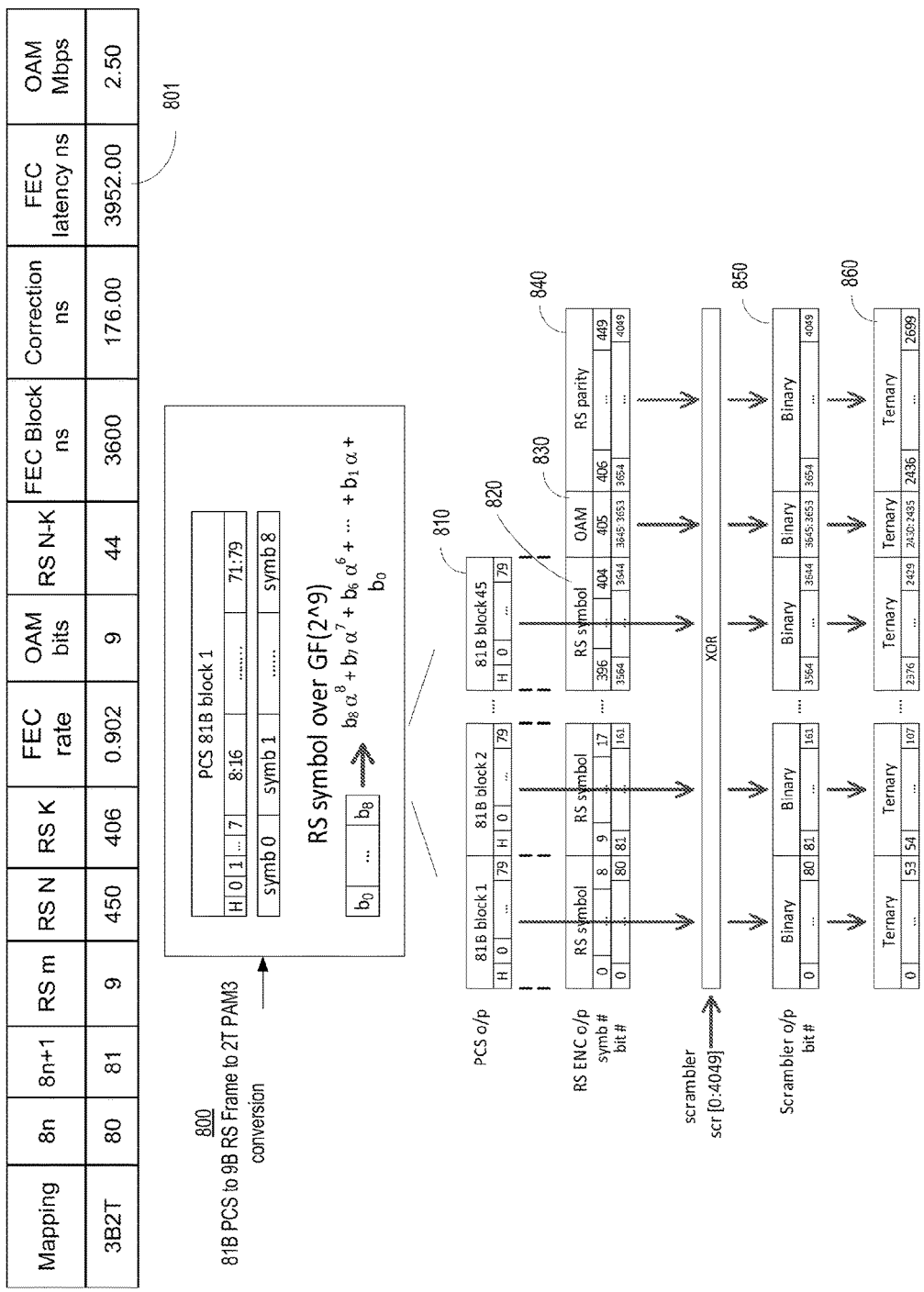
FIG. 8 illustrates an example data flow using the system.

FIG. 8 illustrates an example of a data flow using the system. The logic illustrates a specific example in which the PHY circuitry 200 is configured as described in table 801. The setting values used to configure, or setup the PHY circuitry 200 may be based on a target transmission rate. For example, the target transmission rate may be to be compliant with a particular standard, such as IEEE 802.3bp. Alternatively or in addition, the setting values may be based on target FEC latency, duration of correction, or any other target parameter. The target parameter may be selected to be in compliance with a standard.

For example, the PCS framer 212 may be setup to convert ten 8-bit words (80 bits) from the MAC layer data into 81-bit PCS blocks 810. An 81-bit PCS block may include the 80 bits of the MAC layer data and a corresponding header bit. The data encoder 215 may aggregate 45 81-bit PCS blocks 810 and convert them into 9-bit RS symbols 820. In this case input to the data encoder 215 may be the 405 RS data symbols 820 corresponding to the 45 blocks of 81-bit PCS block 810. In addition, the data encoder 215 may encode an OAM RS symbol 830 corresponding to OAM bits. In addition, the data encoder 215 may generate 44 RSC symbols 840 for parity check. Thus, the RS encoder may output 4050 bits corresponding to the 450 9-bit RS symbols generated.

The data scrambler 218 may scramble the 4050 bits output by the data encoder 215. The scrambled data 850 output by the data scrambler 218, thus, includes 4050 bits based on the 4050 bits output by the data encoder 215. The data mapper 221 may be a 3B2T data mapper that converts 3-bits of the scrambled data 850 into ternary data 860 that includes 2-ternary symbols based on a predetermined mapping scheme, such as the table 620. The data mapper 221, in this case, may generate 2700 2D-PAM3 symbols corresponding to the scrambled data 850. The AFE TX 230 may convert the 2D-PAM3 symbols to corresponding voltage levels and transmitted across the communication link 150. Thus, the MAC layer data is transformed into the transmitted voltage levels.

The combination of 9 bits out of the PCS blocks 810 into RS symbols may be expressed as a Galois Field (GF) polynomial of a primitive element in the field. For example, a GF polynomial for the converting between 9 bits and a RS symbol is illustrated in the conversion 800.

Figure 9:
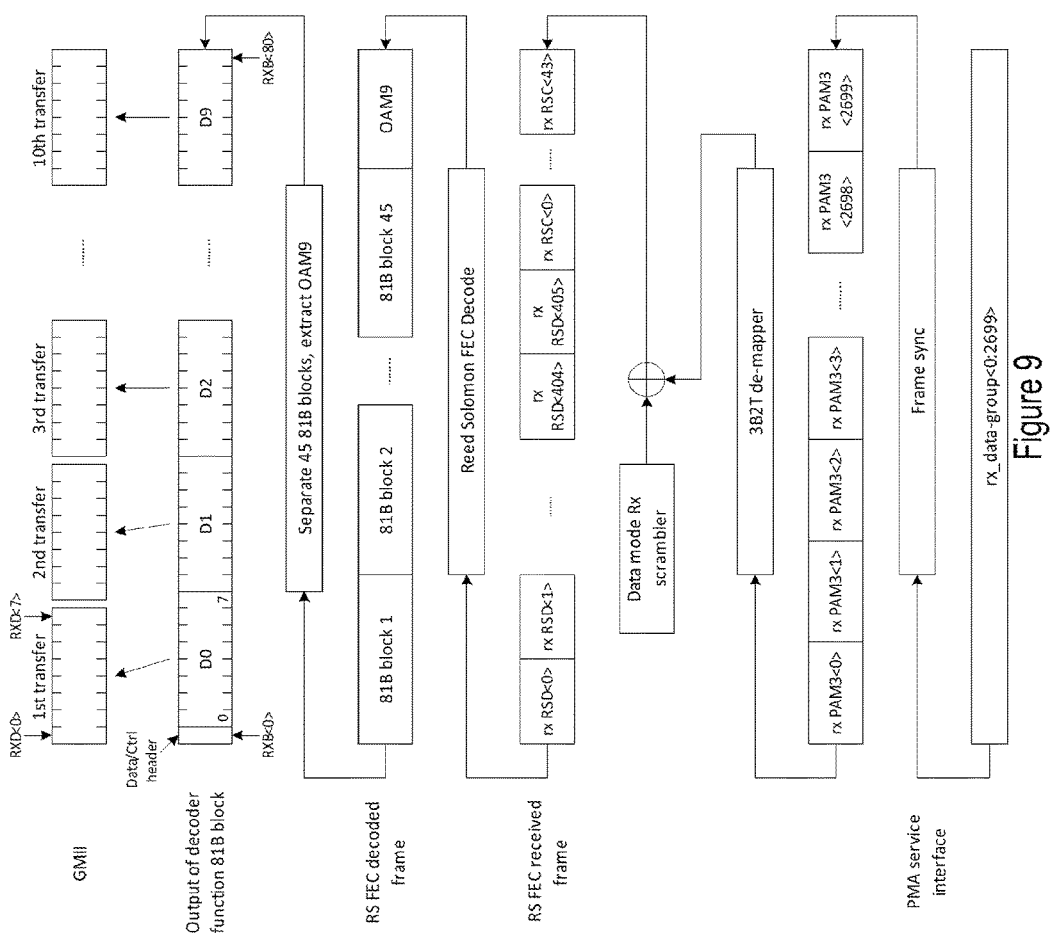
FIG. 9 illustrates an example data flow through the components of a receiver.

FIG. 9 illustrates an example data flow through the components of the receiver 203. The data flow may be in reverse order of that through the transmitter 201 as described throughout the present disclosure. Accordingly, the link interface 209 may receive the analog signals from the communication link 150.

The AFE RX 250 may comprise a programmable gain amplifier (PGA) and an analog to digital converter (ADC) that converts the analog signals received from the hybrid 210 and link interface 209 into digital data, such as in the form of binary words. The converted digital data may be further processed by the echo canceller 207 to remove the residual reflections of the transmit signals. The digital data may be further equalized by the FFE 262, DFE 265, and slicer 268. The FFE 262 may be a finite impulse response (FIR) filter and that uses voltage levels of the received data associated with previous and future symbols to correct the voltage level of the current symbol. The DFE 265 may further equalize residual linear distortions contributed by the previous symbols. Finally the slicer 268 may make decisions on the received data based upon the equalized signal. In an example, the outputs from the DFE 265 and the FFE 262 may be added together at an adder and the result provided to the slicer 268. The slicer 268 may be responsive to the received signals at its input, and outputs the nearest symbol value from the constellation of allowed discrete levels, for example as shown in constellation 610. The slicer 268, thus, provides the PAM symbols in digital format.

The input to the data de-mapper 271 thus comprises received PAM symbols, such as the 2D-PAM3 symbols from the transmitter 201, of link partner PHY circuitry 200. The received PAM3 symbols may be arranged in predetermined groups that match to the RS-FEC frame boundaries at the transmitter. For example, the data may be received in groups of 2700 2D-PAM3 symbols.

The data de-mapper 271 may receive the PAM symbols output by the slicer 268. The data de-mapper 271 may be circuitry that reverses the mapping scheme used by the data mapper 221. For example, the data de-mapper 271 may use the mapping table 620 to map the 2D-PAM3 symbols back to 3 bits of data. In an example, the data de-mapper 271 may be a 3B2T de-mapper, which converts 2 ternary data into 3 bits of binary data. In the above example, the data de-mapper may map 2700 PAM3 symbols and output 4050 bits.

The output of the data de-mapper 271 may be processed by the data de-scrambler 274. The data de-scrambler 274 may be an additive de-scrambler with identical implementation as the data scrambler 218. During the initial link up process the two PHYs may exchange settings and preferences by utilizing an information exchange protocol, such as an InfoField exchange protocol defined in IEEE 802.3bp, among other protocols. Through the InfoField exchange, the transmitter may notify the link partner on the initial state and exact starting time of the data scrambler 218. Further, once activated and synchronized, both the transmit data scrambler and the receive data de-scrambler may run continuously, thus maintaining synchronization without requiring transmission of periodic sync-words afterwards, as long as the clock timing remain locked between the two PHY's. Accordingly, the de-scrambler at the receiver's PHY circuitry may not be affected by bit errors, as long as clock timing remains locked. The de-scrambled bits output by the data de-scrambler 274 may be forwarded to the data decoder 277. The de-scrambled bits may include the data bits, the OAM bits, and the corresponding parity check bits.

The data decoder 277 may be a decoder corresponding to the data encoder 215. The data decoder 277, for example, may be a RS decoder corresponding to the RS encoder in the transmitter 201. The RS decoder may be setup with setting values similar to those in the RS encoder to be compliant with the same standard as the transmitter 201. Accordingly, the RS decoder may group the de-scrambled bits into FEC frames of the predetermined length of the FEC frame. For example, the RS decoder may divide the 4050 de-scrambled bits into 450 9-bit FEC frames that include 406 RSD symbols and 44 RSC symbols. The RS decoder may subsequently convert the FEC frames into PCS blocks of the predetermined length. For example, corresponding to the transmitter 201 example above, the RS decoder may convert the decoded 406 9-bit RS symbols into 45 81-bit PCS blocks and 9 OAM bits. The PCS blocks may be forwarded to the PCS de-framer 280. The data decoder 277 may forward the OAM bits decoded from the de-scrambled bits to the circuitry that handles OAM standards or protocols.

The PCS de-framer 280 may be circuitry that converts the PCS blocks into MAC layer data. For example, the PCS de-framer may, based on header information in the PCS block, convert the PCS block data into MAC layer data. In the above example, the PCS de-framer may output 10 8-bit words for each 81-bit PCS block. The PCS de-framer output may be transmitted via the media independent interface 205 for further processing by the MAC circuitry. For example, the data may be forwarded to an automobile component for further processing.

Figure 10:
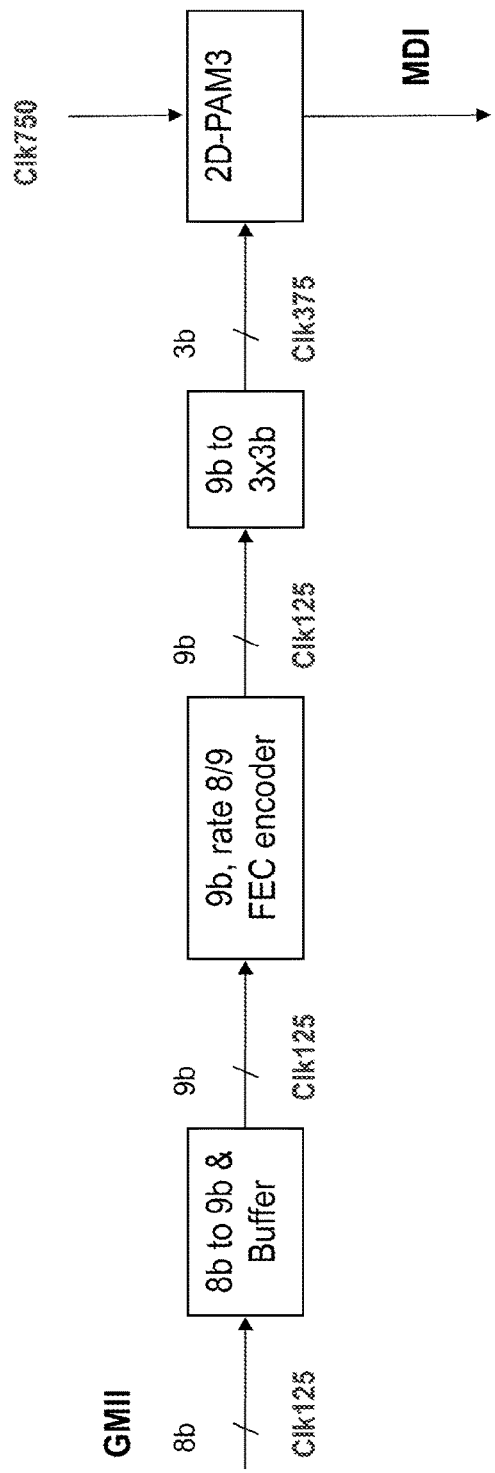
FIG. 10 illustrates example clocking from GMII to MDI.

FIG. 10 illustrates example clocking from GMII to MDI. The clocks used in the system may be all multiples of a particular frequency, such as 25 MHZ. The hardware unit that encodes the constellations using the coding scheme described throughout the present disclosure may have a clock source operating at a much higher frequency.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
   a media independent interface circuitry configured to receive, from an automobile component, binary data and corresponding management information to be transmitted via a communication link;
   an encoder circuitry configured to generate forward error correction (FEC) frames that contain the binary data and the management information; and
   a communication interface circuitry configured to transmit the FEC frames that contain the binary data and the management information via the communication link.

2. The system of claim 1, further comprising:
   a scrambler circuitry configured to scramble the FEC frames exclusive of the management information; and
   a data mapper circuitry configured to convert the scrambled FEC frames into pulse amplitude modulation (PAM) symbols according to a predetermined conversion scheme, wherein the communication interface circuitry is configured to transmit the FEC frames via the communication link by transmitting the PAM symbols via the communication link.

3. The system of claim 2, wherein the predetermined conversion scheme converts a predetermined amount of binary data from the scrambled FEC frames into a corresponding predetermined number of PAM symbols.

4. The system of claim 3, wherein conversion of the predetermined amount of binary data to the corresponding predetermined number of PAM symbols comprises mapping 3 binary bits into 8 pairs of voltage levels based on a 2D-PAM3 constellation.

5. The system of claim 1, further comprising:
   a data mapper circuitry configured to convert the FEC frames into pulse amplitude modulation (PAM) symbols according to a predetermined conversion scheme, wherein the communication interface circuitry is configured to transmit the FEC frames via the communication link by transmitting the PAM symbols via the communication link.

6. The system of claim 1, wherein the encoder circuitry determines a size of each FEC frame from the generated FEC frames, and the size is based on a predetermined transmission rate over the communication link.

7. The system of claim 1, further comprising:
   a physical coding sublayer (PCS) framer circuitry configured to generate a PCS frame, the PCS frame comprising a predetermined number of bits of the binary data appended with a corresponding header information.

8. The system of claim 7, wherein the encoder circuitry is further configured to:
   aggregate a first predetermined number of PCS frames from the PCS framer circuitry; and
   generate a second predetermined number of FEC frames corresponding to the first predetermined number of PCS frames from the PCS framer circuitry.

9. The system of claim 8, wherein the encoder circuitry is further configured to generate parity check frames corresponding to the second predetermined number of FEC frames.

10. The system of claim 9, wherein the encoder circuitry is further configured to generate a management FEC frame comprising the management information.

11. A system comprising:
    a physical media communication interface configured to receive data from an automobile component over a physical media;
    converter circuitry configured to convert the data into a forward error correction (FEC) frame that comprises a plurality of symbols;
    decoder circuitry configured to decode, from the plurality of symbols, a plurality of data symbols and a management symbol; and a media independent interface configured to transmit the plurality of data symbols and the management symbol to another automobile component for further processing.

12. The system of claim 11, wherein the received data is a two-dimensional pulse amplitude modulation (PAM3) symbol using a nine-point constellation.

13. The system of claim 11, wherein the physical media is a two conductor cable.

14. The system of claim 11, wherein the decoder circuitry comprises a Reed-Solomon decoder configured to generate data symbols of a predetermined size.

15. The system of claim 14, wherein a length of a data symbol is determined based on a predetermined transmission speed of the system.

16. The system of claim 11, wherein the received data comprises ternary data and the converter circuitry further comprises:
 data de-mapper circuitry configured to convert the ternary data into binary data based on a predetermined mapping scheme; and
 de-scrambler circuitry configured to convert the binary data into the forward error correction (FEC) frame.

17. The system of claim 16, wherein the data de-mapper circuitry is further configured to aggregate a predetermined number of ternary data symbols prior to conversion of the aggregated ternary data symbols into binary data based on the predetermined mapping scheme.

18. A method comprising:
 generating, by a physical coding sublayer (PCS) framer circuitry, PCS blocks based at least in part on received MAC layer data;
 aggregating, by an encoder circuitry, a predetermined number of PCS blocks and operations, administration, and maintenance (OAM) bits to generate aggregated PCS blocks;
 scrambling, by a data scrambler circuitry, the aggregated PCS blocks to generate scrambled aggregated PCS blocks, wherein the data scrambler circuitry does not scramble the OAM bits of the aggregated PCS blocks; and
 transmitting the aggregated scrambled PCS blocks via a communication link.

19. The method of claim 18, further comprising:
 generating, by a data mapper, pulse amplitude modulation (PAM) symbols corresponding to the aggregated scrambled PCS blocks, wherein transmitting the aggregated scrambled PCS blocks via the communication link comprises transmitting the PAM symbols via the communication link.

20. The method of claim 18, further comprising:
 generating, by the encoder circuitry, forward error correction (FEC) frames comprising the aggregated scrambled PCS blocks; and
 generating, by a data mapper, pulse amplitude modulation (PAM) symbols corresponding to the FEC frames, wherein transmitting the aggregated scrambled PCS blocks via the communication link comprises transmitting the PAM symbols via the communication link.

* * * * *